United States Patent Office 2,833,661
Patented May 6, 1958

2,833,661

COMPOSITION COMPRISING WATER SOLUBLE ORGANIC POLYMER AND COLLOIDAL SILICA AND PROCESS OF COATING THEREWITH

Ralph K. Iler, Brandywine Hundred, Del., assignor to E. I. du Pont de Nemours and Company, Wilmington, Del., a corporation of Delaware No Drawing. Application November 28, 1952
Serial No. 323,140

5 Claims. (Cl. 106—193)

This invention relates to novel chemical compositions which contain a water-soluble organic polymer and an alkali-stabilized colloidal silica and is more particularly directed to such compositions in which the water-soluble organic polymer is an adhesive or film-former and the alkali-stabilized colloidal silica is a material having an ultimate particle size not exceeding about 0.03 micron, preferably prepared by a process including the step of passing an alkali silicate solution through an acid-regenerated ion exchange resin.

This application is a continuation-in-part of my copending application, Serial No. 793,529, filed December 23, 1947, now abandoned.

Alkali silicates having $SiO_2$:alkali oxide weight ratios up to 4:1 are well known commercial products, and procedures for making colloidal silica solutions from such silicates as, for instance, by acidifying them, are also well known. Unfortunately, most of the colloidal silica solutions made in this manner are unstable, precipitating as gels within relatively short times after preparation. Accordingly it has long been considered impracticable to make and transport colloidal silica solutions in the usual commercial channels.

Recently, however, compositions which may be described as alkali-stabilized colloidal silica solutions have become available. These solutions, prepared by ion exchange as described in Bird Patent 2,244,325, are stable against gelling over prolonged periods, so that it is entirely practicable to transport them and use them at times and places considerably removed from their point of preparation. They contain a combined alkali such as sodium, potassium, ammonium, or organic amine, but the $SiO_2$:alkali weight ratio may be from 10:1 up to as high as 500:1. The alkali is combined in a special manner not found in conventional alkali silicates, since the latter cannot be prepared in a form soluble and stable in aqueous solution at ratios above about 4:1.

Now according to the present invention novel and highly useful compositions are provided which contain a water-soluble organic polymer and an alkali-stabilized colloidal silica. It is preferred that the alkali-stabilized colloidal silica be a material having an ultimate particle size not exceeding about 0.03 micron and be prepared by a process including the step of passing alkali silicate solution through an acid-regenerated ion exchange resin, and that the organic polymer remain water-soluble upon standing in aqueous solution and be an adhesive or film-former, that is, a material which when dissolved in water substantially increases the viscosity thereof.

The organic polymer in a composition of this invention must be water-soluble. It is regarded as water-soluble if it makes a solution which is stable and has the appearance of a true solution even though the degree of dispersion is no greater than that customarily referred to as a "colloidal solution." Some organic polymers are soluble at low molecular weights but become insoluble in their higher degrees of polymerization, and it is intended to include only those which are substantially water soluble, that is, which have a water solubility in excess of about 10 grams per liter at 25° C., and are stable in that they remain soluble upon standing in water solution.

A representative class of soluble polymers to which the invention is applicable with especial advantage consists of hydroxylated polymers—namely, those having a plurality of hydroxyl groups distributed along the molecular chain of the polymer. This class includes methyl cellulose, polyvinyl alcohol, dextrine, and soluble starches. Certain starches, in their raw state, are insoluble, but may be solubilized by treatments such as with an acidic gas such as sulfur trioxide, and when so treated are within this preferred class of polymers.

Other water soluble organic polymers which may be used include, for instance, a water-soluble alginate, a water-soluble protein derivative such as ammonium caseinate, a water-soluble polyamide such as glue, a polymeric cellulosic derivative such as sodium cellulose glycollate, or a water-soluble polyethylene oxide.

When reference is made herein to the water solubility of an organic polymer this will be understood to refer to the solubility of the polymer in water alone and not necessarily in the presence of alkali-stabilized colloidal silica. The colloidal silica in many instances has the effect of reducing the water solubility of the polymer after drying and in fact, in some cases renders it irreversibly insoluble. For instance, although glue is water soluble, particularly in hot water, it is rendered insoluble, particularly at a pH below about 5.0, by the addition of the alkali-stabilized colloidal silica.

The alkali-stabilized colloidal silica used in a composition of this invention is characterized by containing silica in the form of particles having an ultimate particle size not exceeding about 0.03 micron (30 millimicrons) and preferably in the range from 0.01 to 0.03 micron (10 to 30 millimicrons). By "ultimate particle size" is meant the average size of particle observed by the electron microscope to be present when the solution is diluted to about 0.1% $SiO_2$ with water and dried in a very thin layer deposit.

The silica solutions are also characterized by having alkali ions so disposed around the particles as to prevent condensation between the particles by oxolation in aqueous solution at a concentration not exceeding about 45% $SiO_2$ by weight. As freshly prepared, the silicic acid in a silica solution may exist as low molecular weight polymers of the theoretical $Si(OH)_4$; however, a condensation reaction known as "oxolation" rapidly occurs whereby water splits out between hydroxyl groups attached to silicon atoms, an Si—O—Si linkage is formed, and a polymer is produced. This process may continue indefinitely and in such a manner that the silicic acid solution rapidly sets up to a gel, the oxolation occurring between externally disposed hydroxyls, i. e., hydroxyls not already inactivated by being inwardly located within a siloxane ring or micelle. It has been found, however, that such polymerization is retarded by the presence of a small amount of combined alkali such as sodium.

A logical explanation for such retardation of the gelling rate of silicic acid solution has been that the sodium ions act as "blocking groups" and inactivate the active acid hydrogen in a sufficient number of externally disposed hydroxyl groups to prevent further oxolation in a concentration not exceeding about 45% $SiO_2$. This stabilization may be accomplished by processes described in the Bird U. S. Patent 2,244,325. In order to produce stable solutions with a minimum of alkali stabilizing agent, the polymerization of the silicic acid may be carried to a relatively high molecular weight, by build-up of the size of the ultimate particles by methods described in Bechtold et al. U. S. Patent 2,574,902, so as to produce large molecules or colloidal particles which then retain only a small percentage of the relative hydroxyl groups originally present, and which thus require only a small amount of alkali as a stabilizer. On the other hand the polymerization must not proceed to the formation of a gel.

The most practical method for producing stabilized aqueous colloidal silica solutions consists in passing an alkali silicate solution through an acid-regenerated ion exchange resin as described in the above-mentioned Bird patent whereby alkali ions are removed from the silicate and replaced with hydrogen ions. The alkali ions may be completely removed and then alkali hydroxide may be added back to furnish the necessary alkali ions required as blocking groups.

A particular stabilized aqueous colloidal silica solution which may be used in a composition of this invention is described in the Bird patent at page 2, column 1, lines 12 to 68. As stated in the Bird patent the weight ratio of $SiO_2$ to $Na_2O$ may be as high as from 75 to 100:1 and as low as 10:1, but ratios from 30:1 to 80:1 give superior results and are preferred. The higher the ratio, of course, the lower will be the number of sodium ions present.

Other alkali-stabilized silica sols, which may be prepared by processes including the step of ion-exchange, and which may be used to especial advantage in the compositions of the present invention are the sols described and claimed in Bechtold et al. U. S. Patent 2,574,902 and Rule U. S. Patent 2,577,485. The former have a silica:alkali ratio of from 60:1 to 130:1, contain discrete silica particles having a molecular weight, as determined by light scattering, of more than one-half million, have a relative viscosity, at 10% $SiO_2$, from 1.15 to 1.55, and contain from 20 to 35 percent by weight of $SiO_2$. The Rule sols have a concentration of up to 50% by weight of $SiO_2$, a silica:alkali metal oxide mol ratio of from 130:1 to 500:1, a relative viscosity of from 1.15 to 1.55 as measured at 10% $SiO_2$ and pH 10 and a specific conductance as measured at 10% $SiO_2$ and 28° C. of less than $$\left(\frac{10,000}{R}+30\right)\times 10^{-6} \text{ mho/cm}.$$

where R is the silica:alkali metal oxide mole ratio, and contain amorphous silica in the form of dense, non-agglomerated, spherical particles having an average diameter of 10 to 130 millimicrons. Water solutions of organic polymers containing these types of alkali-stabilized colloidal silica are especially useful.

Certain colloidal silica solutions which may be used in this invention are characterized by containing silica particles having a weight average molecular weight of about from 0.6 to 50 million as determined by light scattering in aqueous dispersion. This method of determining molecular weight is described in Bechtold and Snyder U. S. Patent 2,574,902 at column 4, line 54 et seq.

The alkali-stabilized colloidal silica solutions incorporated in the compositions of this invention are still further characterized by having, in dilute aqueous solution, an extinction coefficient of less than 0.25 for light having a wavelength of 400 millimicrons. The extinction coefficient may be determined by methods with which the art is already familiar (see, for instance, Bechtold et al. U. S. Patent 2,574,902, column 4, line 27 et seq.)

A composition of the present invention may be produced by separately preparing an aqueous dispersion of the organic polymer and mixing it with an alkali-stabilized colloidal silica solution or it may be prepared by dispersing the organic polymer directly in such alkali-stabilized colloidal silica solution. By the former method, for instance, one might simply mix an aqueous dispersion or solution of glue with an aqueous sodium-stabilized colloidal silica solution, whereas by the latter method one might disperse glue in the sodium-stabilized colloidal silica solution, for example, by stirring a mixture of the solid glue at a pH above about 5 in the colloidal silica solution until dissolved.

Another advantageous method for producing a composition of this invention consists in laying down a film of the organic polymer, such as by coating paper with an aqueous polyvinyl alcohol solution, and applying the sodium-stabilized colloidal silica to this film. In this case the polyvinyl alcohol film is water soluble and the colloidal silica penetrates into it, thereby forming a composition of the present invention. This embodiment of the invention is particularly useful for such purposes as decreasing water sensitivity of the organic polymers.

The relative proportions of the organic polymer and colloidal silica in composition of this invention may be widely varied. In general it has been found that as little as 2 parts of alkali-stabilized colloidal silica per 100 parts of organic polymer is sufficient to provide an appreciable modification of the properties of the organic polymer dispersions.

Compositions of this invention are useful for a variety of purposes. In particular, the compositions containing polymers which produce a substantial increase in the viscosity of water are useful as adhesives. The dispersions are also useful as coating and impregnating compositions. They are especially effective as binders for particulate materials such as mineral fibers, glass wool, and exfoliated vermiculite.

The inveniton will be better understood by reference to the following illustrative examples.

*Example 1*

This is an example in which the water-soluble organic polymer used with alkali-stabilized colloidal silica is ammonium caseinate.

A 15% casein solution was made by soaking 75 g. of casein in 425 g. of water for 40 minutes and adding 4.13 g. of ammonium hydroxide solution containing 28% $NH_3$. The mixture was heated to 60° C. for 15 minutes with stirring. A commercial preservative for the casein was added and the mixture was strained through cheese cloth.

A clay slip containing 57% clay was made up by adding a kaolinitic clay gradually to 1 liter of water with stirring. When the mixture thickened, 23 g. of sodium silicate solution (containing 28.95% total solids and having an $SiO_2$:$Na_2O$ weight ratio of 3.5) was added and the addition of clay continued until 1,326 g. had been used.

A coating mixture suitable for applying to paper was made up by adding 418 g. of the above-described casein solution with stirring to 1000 g. of the clay slip, giving a mixture containing 11 parts casein to 100 parts clay. A silica-modified coating mixture was made by adding to 300 g. portions of unmodified coating mixtures, 3.88 g., 14.2 g., and 50.7 g., respectively, of 30% colloidal silica solution which was alkali-stabilized and which had been made by passing a sodium silicate solution through an acid-regenerated ion exchange resin and concentrating the effluent thus obtained by constant-volume evaporation to 30% $SiO_2$. The colloidal silica solution had an $SiO_2$:$Na_2O$ weight ratio in the range from 70:1 to 120:1 and the size of the ultimate silica particles was in the range of 15 to 20 millimicrons. These amounts of added colloidal silica amounted to 1%, 3%, and 10% of silica, respectively, based on the weight of total solids in the coating mixture.

Coatings were applied by means of a laboratory coating machine at a thickness of 1 and 2 mils to 5 mil kraft paper using both the unmodified and the silica-modified coating mixtures.

It was found that in each case the silica-modified coating mixture gave a coating which was substantially more adherent to the paper than were coatings made from the mixture containing no colloidal silica.

Example 2

In this example, the water-soluble organic polymer used was polyvinyl alcohol.

A solution containing 5.5% by weight of polyvinyl alcohol was prepared by mixing polyvinyl alcohol which had an intrinsic viscosity of 240 centipoises with cold water and heating with stirring to 90° C. in a water bath until solution was complete. The solution had a viscosity of 1500 centipoises at 25.5° C. A coating composition was made by mixing 257 g. of this solution with a 55.3% clay slip prepared as described in Example 1 to give a ratio of 3/100 of polyvinyl alcohol to clay and a solids content of 48.4%.

Silica-modified mixtures were made by adding 30% alkali-stabilized colloidal silica prepared as described in Example 1 to the polyvinyl alcohol coating mixture just described. Thus, to make 1% and 3% silica-modified mixtures there was added to 300 g. of the unmodified material 4.84 g. and 14.52 g., respectively, of 30% colloidal silica. The final solids content in the 1% modified mixture was 48.1% and in the 3% modified mixture, 47.6%. These coating compositions were thick, but being thixotropic, spread very easily.

Coatings were made on paper using each of the above-described coating compositions. It was found that the incorporation of the alkali-stabilized colloidal silica into the polyvinyl alcohol coating composition substantially increased the wet rub resistance of the coating and favorably modified the ink-absorbing characteristics of the surface.

Example 3

In this example the water soluble organic polymer used was methyl cellulose.

A 2.5% solution of methyl cellulose which had an absolute viscosity of 1500 centipoises measured in a 2% solution at 20° C. was made up by dissolving the methyl cellulose in water. To a portion of this solution was added a sodium-stabilized colloidal silica solution containing 18% $SiO_2$ which had been prepared by ion exchange from sodium silicate, followed by concentration. The particle size of the silica was about 10 millimicrons. Films were cast from the methyl cellulose solution and from the silica-modified solution by pouring the solutions on to glass plates.

It was found that the silica-modified film, after drying, had substantially improved water resistance as compared with the unmodified film.

I claim:

1. An aqueous medium having an alkali-stabilized colloidal silica sol of ultimate particle size in the range 0.01 to 0.03 micron dispersed therein and a water-soluble organic polymer dissolved therein, the polymer being selected from the group consisting of polyvinyl alcohol and methyl cellulose and the silica having a molecular weight of from 0.6 million to 50 million as determined by light scattering in aqueous solution.

2. An aqueous medium having a sodium alkali-stabilized colloidal silica sol of ultimate particle size in the range of 0.01 to 0.03 microns and a $SiO_2/Na_2O$ ratio of 10:1 to 500:1 dispersed therein and a water-soluble organic polymer dissolved therein, the polymer being selected from the group consisting of polyvinyl alcohol and methyl cellulose and the silica having a molecular weight of from 0.6 million to 50 million as determined by light scattering in aqueous solution.

3. An aqueous medium having an alkali-stabilized colloidal silica sol of ultimate particle size in the range of 0.01 to 0.03 microns dispersed therein and water-soluble polyvinyl alcohol dissolved therein, the silica in the sol having a molecular weight of from 0.6 million to 50 million as determined by light scattering in aqueous solution.

4. An aqueous medium having an alkali-stabilized colloidal silica sol of ultimate particle size in the range of 0.01 to 0.03 micron dispersed therein and water-soluble methyl cellulose dissolved therein, the silica in the sol having a molecular weight of from 0.6 million to 50 million as determined by light scattering in aqueous solution.

5. A process of forming a water resistant coating which comprises coating a porous support from an aqueous media with a water-soluble organic polymer and an alkali-stabilized colloidal silica sol of ultimate particle in the range of 0.01 to 0.03 microns, the polymer being selected from the group consisting of polyvinyl alcohol and methyl cellulose and the silica having a molecular weight of from 0.6 million to 50 million as determined by light scattering in aqueous solution.

References Cited in the file of this patent

UNITED STATES PATENTS

| | | |
|---|---|---|
| 2,383,653 | Kirk | Aug. 28, 1945 |
| 2,527,329 | Powers et al. | Oct. 24, 1950 |
| 2,597,872 | Iler | May 27, 1952 |

OTHER REFERENCES

Wakeman: "The Chemistry of Commercial Plastics," Reinhold, New York (1947), pages 174 and 175.